(12) United States Patent
Nakajima et al.

(10) Patent No.: US 11,627,122 B2
(45) Date of Patent: Apr. 11, 2023

(54) INTER-SYSTEM LINKING METHOD AND NODE

(71) Applicant: HITACHI, LTD., Tokyo (JP)

(72) Inventors: Jun Nakajima, Tokyo (JP); Yoji Ozawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 755 days.

(21) Appl. No.: 16/576,313

(22) Filed: Sep. 19, 2019

(65) Prior Publication Data

US 2020/0314078 A1 Oct. 1, 2020

(30) Foreign Application Priority Data

Mar. 28, 2019 (JP) .............................. JP2019-063114

(51) Int. Cl.
| | |
|---|---|
| *G06F 7/02* | (2006.01) |
| *G06F 16/00* | (2019.01) |
| *H04L 9/40* | (2022.01) |
| *G06F 3/06* | (2006.01) |
| *G06F 16/178* | (2019.01) |
| *G06F 16/27* | (2019.01) |
| *H04L 9/06* | (2006.01) |

(52) U.S. Cl.
CPC .............. *H04L 63/08* (2013.01); *G06F 3/067* (2013.01); *G06F 16/178* (2019.01); *G06F 16/27* (2019.01); *H04L 9/0637* (2013.01)

(58) Field of Classification Search
CPC ....... H04L 63/08; G06F 16/27; G06F 16/178; G06F 16/1748; G06F 16/174; G06F 3/067; G06F 3/064; G06F 3/0641
See application file for complete search history.

(56) References Cited

U.S. PATENT DOCUMENTS

| | | | |
|---|---|---|---|
| 2018/0225611 A1* | 8/2018 | Daniel | G06Q 10/06315 |
| 2020/0293514 A1* | 9/2020 | Rudek | G06F 21/6245 |
| 2021/0073212 A1* | 3/2021 | Conley | H04L 9/3239 |

OTHER PUBLICATIONS

"Ehereum White Paper", Online Retrieved Dec. 27, 2018, URL: https//github.com/ethereum/wiki/wiki/[English]-White-Paper.
"Hyper Ledger Fabric", Online searched on Dec. 27, 2018, URL: http://hyperledger-fabric.readthedocs.io/en/latest/.
"Oracrize Documentation", Online searched on Dec. 27, 2018, URL: https://docs.oraclize.it/.
"Proposal of Secure Interwork Between Blockchains", Symposium on Cryptography and Information Security 2018.

* cited by examiner

*Primary Examiner* — Bruce M Moser
(74) *Attorney, Agent, or Firm* — Volpe Koenig

(57) ABSTRACT

A method includes: determining presence or absence of duplication processing by a node 1000, the node constituting each of a plurality of distributed ledger systems and managing identification information of call processing from a program on another distributed ledger system 1; and executing the call processing after deduplication of the call processing is executed based on a specific policy.

12 Claims, 12 Drawing Sheets

REQUEST MANAGEMENT TABLE 1130

| Request ID 1131 | Request NodeID 1132 | Request Content 1133 | Status 1134 | Result 1135 |
|---|---|---|---|---|
| Req_100 | Node1 | Write("X", 500) | Fin | Success |
| Req_80 | Node1 | Write("A", Read("A") + 100) Write("B", Read("B") − 100) | Processing | — |
| Req_80 | Node2 | Write("A", Read("A") + 100) Write("B", Read("B") − 100) | Waiting | — |
| Req_80 | Node3 | Write("A", Read("A") + 100) Write("B", Read("B") − 100) | Waiting | — |
| ... | | ... | ... | ... |

FIG. 4

REQUEST MANAGEMENT TABLE

| Request ID 1131 | Request NodeID 1132 | Receive NodeID 1136 | Request Content 1133 | Status 1134 | Result 1135 |
|---|---|---|---|---|---|
| Req_100 | Node10 | NodeX | Invoke (write("X", 500)) | Fin | Success |
| Req_80 | Node10 | NodeX | Invoke(Write("A", Read("A") + 100); Write("B", Read("B") – 100);) | Processing | – |
| Req_80 | Node12 | NodeY | Invoke(Write("A", Read("A") + 100); Write("B", Read("B") – 100);) | Waiting | – |
| Req_80 | Node13 | NodeZ | Invoke(Write("A", Read("A") + 100); Write("B", Read("B") – 100);) | Waiting | – |
| ... | ... | ... | ... | ... | ... |

FIG. 8

REQUEST MANAGEMENT TABLE 1130 1131 1132 1136 1137 1133 1134 1135

| Request ID | Request NodeID | Receive NodeID | Request Type | Request Content | Status | Result |
|---|---|---|---|---|---|---|
| Req_100 | Node1 | NodeX | Tight | Write("X", 500) | Fin | Success |
| Req_90 | Node10 | NodeX | Loose | Invoke(Write("A", Read("A") + 100); Write("B", Read("B") - 100);) | Processing | - |
| Req_90 | Node12 | NodeY | Loose | Invoke(Write("A", Read("A") + 100); Write("B", Read("B") - 100);) | Waiting | - |
| Req_90 | Node13 | NodeZ | Loose | Invoke(Write("A", Read("A") + 100); Write("B", Read("B") - 100);) | Waiting | - |
| Req_80 | Node1 | NodeX | Tight | Write("A", Read("A") + 100) Write("B", Read("B") - 100) | Processing | - |
| Req_80 | Node2 | NodeX | Tight | Write("A", Read("A") + 100) Write("B", Read("B") - 100) | Waiting | - |
| Req_80 | Node3 | NodeX | Tight | Write("A", Read("A") + 100) Write("B", Read("B") - 100) | Waiting | - |

FIG. 11

INTER-SYSTEM LINKING METHOD AND NODE

CROSS-REFERENCE TO RELATED APPLICATION

This application claims priority pursuant to 35 U.S.C. § 119 from Japanese Patent Application No. 2019-63114, filed on Mar. 28, 2019, the entire disclosure of which is incorporated herein by reference.

BACKGROUND

Technical Field

The present invention relates to an inter-system linking method and a node.

Related Art

In the related art, there has been developed a technology for replacing transactions, which have been performed via a trusted central authority organization such as a financial institution or a government, with direct transactions by P2P (Peer to Peer) between users. In other words, it is a distributed ledger technology using a blockchain (hereinafter also referred to as BC).

The main features of the distributed ledger technology are: (1) in a transaction between participants to the distributed ledger system, a transaction is established by forming consensus or approval by the participants (any or a specific participant), not by the central authority organization, (2) a plurality of transactions are collected as blocks, recorded in a distributed ledger called a blockchain in a string, and hash calculation is performed on consecutive blocks to make falsification substantially impossible, and (3) all participants share the same ledger data, thereby enabling confirmation of the transactions by all the participants.

As an application example of the distributed ledger technology, a smart contract (hereinafter also referred to as SC) has been proposed. This SC is capable of applying the distributed ledger technology to complex transaction conditions and various applications, and is a logic that describes not only transaction data but also transaction conditions.

A technology relating to the SC described above has been proposed in the related art (see "*Ethereum White Paper*", [online] [Retrieved Dec. 27, 2018] Internet<URL: https//github.com/ethereum/wiki/wiki/[English]-White-Paper> and "*Hyper ledger Fabric*", [online], [searched on Dec. 27, 2018], Internet <URL: http://hyperledger-fabric.readthedocs.io/en/latest/>) relating to a distributed ledger infrastructure having an execution function of the SC.

A so-called consortium type distributed ledger infrastructure has also been proposed. In the distributed ledger infrastructure, only a computer approved by a specific plurality of or one group and person such as a consortium of a specific industry or a plurality of companies related to a supply chain becomes a transaction authorizer. In such a consortium type distributed ledger infrastructure, there exists a management entity for selecting an authorizer, so that the speed of the transaction approval is advantageously increased.

In the various distributed ledger infrastructure that have been developed in this manner, the transaction (hereinafter referred to as TX) is accepted while forming consensus between nodes at a predetermined agreement level to execute the TX at each node, and the execution result of the TX is retained, thereby sharing the information (ledger) on a plurality of nodes. Further, the above described TX is provided with an SC execution function for executing the predetermined logic.

On the other hand, it is also assumed that the application of a BC technology proceeds in different types of service and different scenes of use. In this case, it is necessary to bring the transactions between a plurality of the BC systems or between the BC system and the system other than the BC system into linked operation in order to map the commercial transactions in the real world.

Therefore, technology related to the realization of such a linked operation (see "*Oracrize Documentation*" [searched on Dec. 27, 2018] Internet <URL: https://docs.oraclize.it/> and "*Proposal of secure interwork between blockchains*", Symposium on Cryptography and Information Security 2018) have been proposed. For example, in the technology of "*Oracrize Documentation*" [searched on Dec. 27, 2018] Internet <URL: https://docs.oraclize.it/>, a linking system is constructed separately from the BC system. The linking system monitors a state change in the BC, and when the state change occurs, executes processing according to the state change for a system outside the BC system. Further, in the technology of "*Proposal of secure interwork between blockchains*", Symposium on Cryptography and Information Security 2018, the linking BC is separately prepared for mutual linkage between the BC systems to realize the linkage by an access from an application through the linking BC.

For example, in the technology of "*Oracrize Documentation*" [searched on Dec. 27, 2018] Internet <URL: https://docs.oraclize.it/>, the linkage can be realized by providing a linking system separately from each BC to be linked. However, the processing accompanied by the linkage is executed by the linking system that does not use the BC. Therefore, the transparency of the processing cannot be secured.

On the other hand, in the technology of "*Proposal of secure interwork between blockchains*", Symposium on Cryptography and Information Security 2018, the processing accompanied by the linkage is described in the SC of the linking BC, so that transparency of the processing can be secured. However, a node is required outside the BC system for calling each BC to be linked by referring to the information of the linking BC. Therefore, the node becomes a single confidence point and a single failure point, and the value of using the BC as the entire system is reduced.

On the other hand, in order to secure transparency of a series of processings including linking processing between a plurality of the BC systems or between the BC system and the system other than the BC system, and to avoid generation of the single confidence point and the failure point in the system, a method of linking the nodes of a plurality of organizations existing in the respective systems to be linked.

However, when the calling source is a BC system, the same processing is executed by the mutual verification properties of the SC in each node in the BC system. For this reason, there is a case where a request from each node of the calling source BC is used to execute duplicated processings in the calling target system, thereby resulting in a wrong processing result. Even if a correct processing result is acquired, redundant processing which does not have an execution meaning may occur.

Accordingly, it is an object of the present invention to provide a technology for realizing an efficient and appropriate inter-BC linking processing while securing transparency of processing under the environment where a single confidence point does not occur.

SUMMARY OF THE INVENTION

In order to solve the above-described problem, the present invention provides an inter-system linking method including: determining presence or absence of duplication processing by a node, the node constituting each of a plurality of distributed ledger systems and managing identification information of call processing from a program on another distributed ledger system; and executing the call processing after deduplication of the call processing is executed based on a specific policy.

The node of the present invention is a node constituting each of a plurality of distributed ledger systems, the node including an arithmetic apparatus configured to determine presence or absence of duplication processing by managing identification information of call processing from a program on another distributed ledger system; and execute the call processing after deduplication of the call processing is executed based on a specific policy.

The present invention realizes an efficient and appropriate inter-BC linking processing while securing transparency of processing under the environment where a single confidence point does not occur.

BRIEF DESCRIPTION OF THE DRAWINGS

FIG. 4 is a diagram illustrating an example of a request management table according to the first embodiment.

FIG. 8 is a diagram illustrating an example of a request management table according to the second embodiment.

FIG. 11 is a diagram illustrating an example of a request management table according to the third embodiment.

DETAILED DESCRIPTION OF THE EMBODIMENTS

Figure 1:
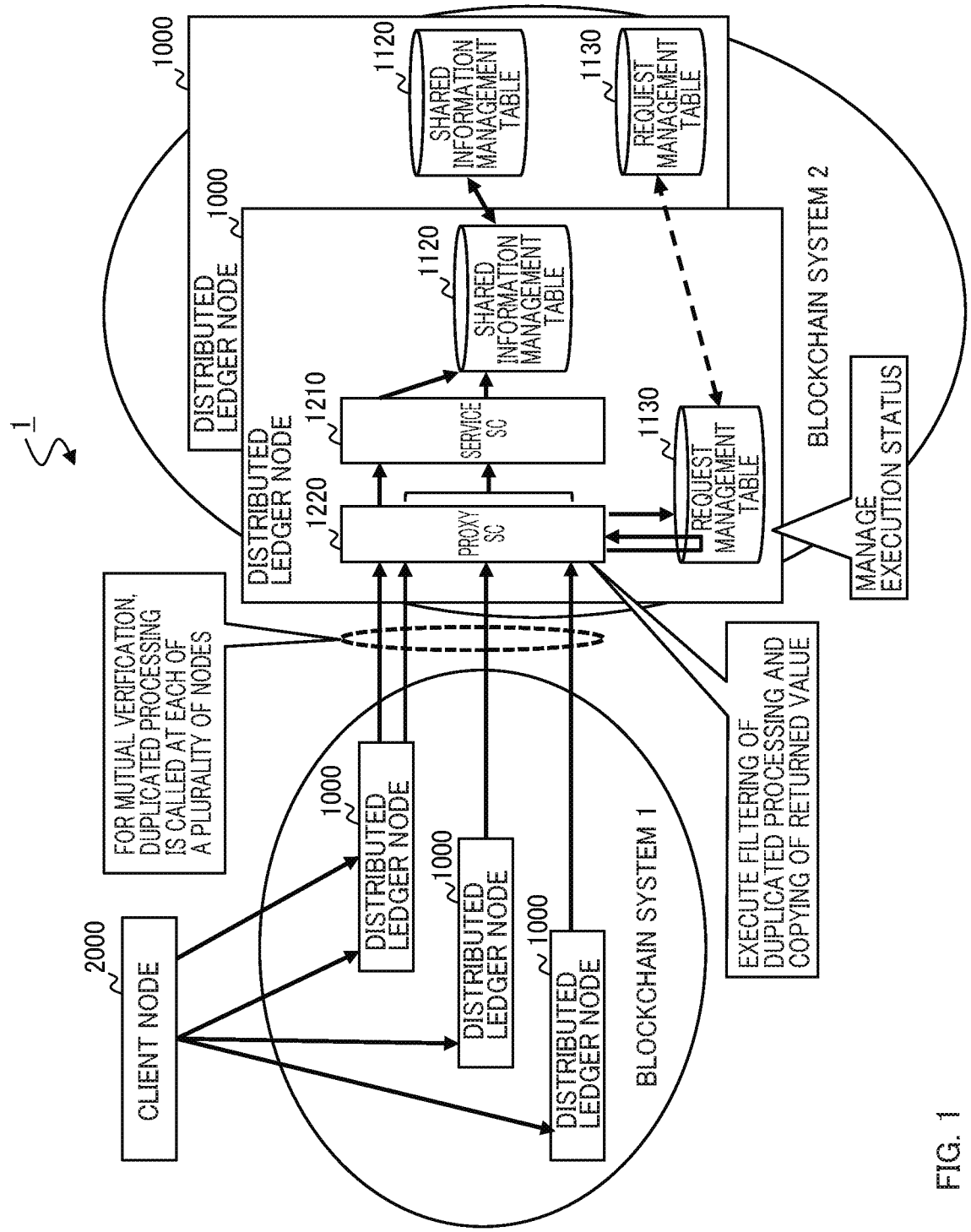
FIG. 1 is a diagram for explaining an outline of a computer system according to the first embodiment.

Several examples will now be described with reference to the drawings. It should be noted that the embodiments described below are not intended to limit the claimed invention, and that all of the elements described in the examples and combinations thereof are not necessarily essential to the solution of the invention. In these drawings, the same reference numerals designate the same components throughout the several views.

It should be noted that although the information of the present invention is described in terms of expressions such as "aaa table" in the following description, the information may be expressed in a form other than the data structure of a table or the like.

Therefore, it is sometimes referred to as "aaa information" for the "aaa table" or the like to indicate that the information is not dependent on the data structure.

Further, in describing the contents of the information, the expressions "identification information", "identifier", "name", and "ID" are used, but they can be replaced with each other.

In the following description, a description will be given with a "program" as a subject, but the description may be given with a processor as a subject because the program may be executed by the processor to perform predetermined processing while using a memory and communication port (a communication device, a management I/F, and a data I/F).

Further, the processing disclosed with the program as the subject may be performed by a computer such as a management server (management computer) or the like, or by an information processing apparatus.

Also, some or all of the programs may be implemented by dedicated hardware. Further, various programs may be installed in each computer by a program distribution server or a storage medium readable by a computer.

The various programs may also be executed in a hypervisor type or a container type virtualization environment.

Hereinafter, a set of one or more computers managing the computer system and displaying the display information of the present invention may be referred to as a management system.

When the management server displays the display information, the management server is a management system. Also, the combination of the management server and a display computer is a management system.

In addition, in order to increase speed and reliability of the management processing, processing similar to the management server may be realized by a plurality of computers, and in this case, a plurality of computers (including a display computer when the display computer performs display) may be used as the management system.

First Embodiment

System Configuration

The computer system according to this example will now be described. FIG. 1 is a diagram for explaining an outline of a computer system according to a first embodiment.

A computer system 1 illustrated here is composed of a plurality of distributed ledger systems, that is, blockchain systems 1 and 2. The blockchain systems 1 and 2 are connected respectively to a client node 2000 so as to be accessible thereto.

In the computer system 1, the client node 2000 issues a TX. Each distributed ledger node 1000 of the blockchain system 1 accepts the TX execution request for mutual verification of the TX. When a processing request is issued respectively to the distributed ledger node 1000 of the blockchain system 2, the proxy SC 1220 performs filtering of duplicated processing requests, and then requests a service SC 1210 to execute the processing. This prevents illegal processing and redundant processing from being executed. It should be noted that the TX described above corresponds to the "call processing" in the present invention, and will hereinafter be referred to as a processing request (the same applies to the following description).

At this time, the proxy SC 1220 manages an execution status of the processing request by using a request management table 1130. In the first embodiment, the request management table 1130 is managed by each of the distributed ledger nodes 1000.

On the one hand, in the second embodiment described later, the request management table 1130 is shared and managed across the distributed ledger nodes 1000. On the other hand, in the third embodiment described later, the management of the request management table 1130 at each of the distributed ledger nodes 1000 and shared management of the request management table 1130 across the distributed ledger nodes 1000 are selectively performed depending on the contents of the processing request.

Figure 2:
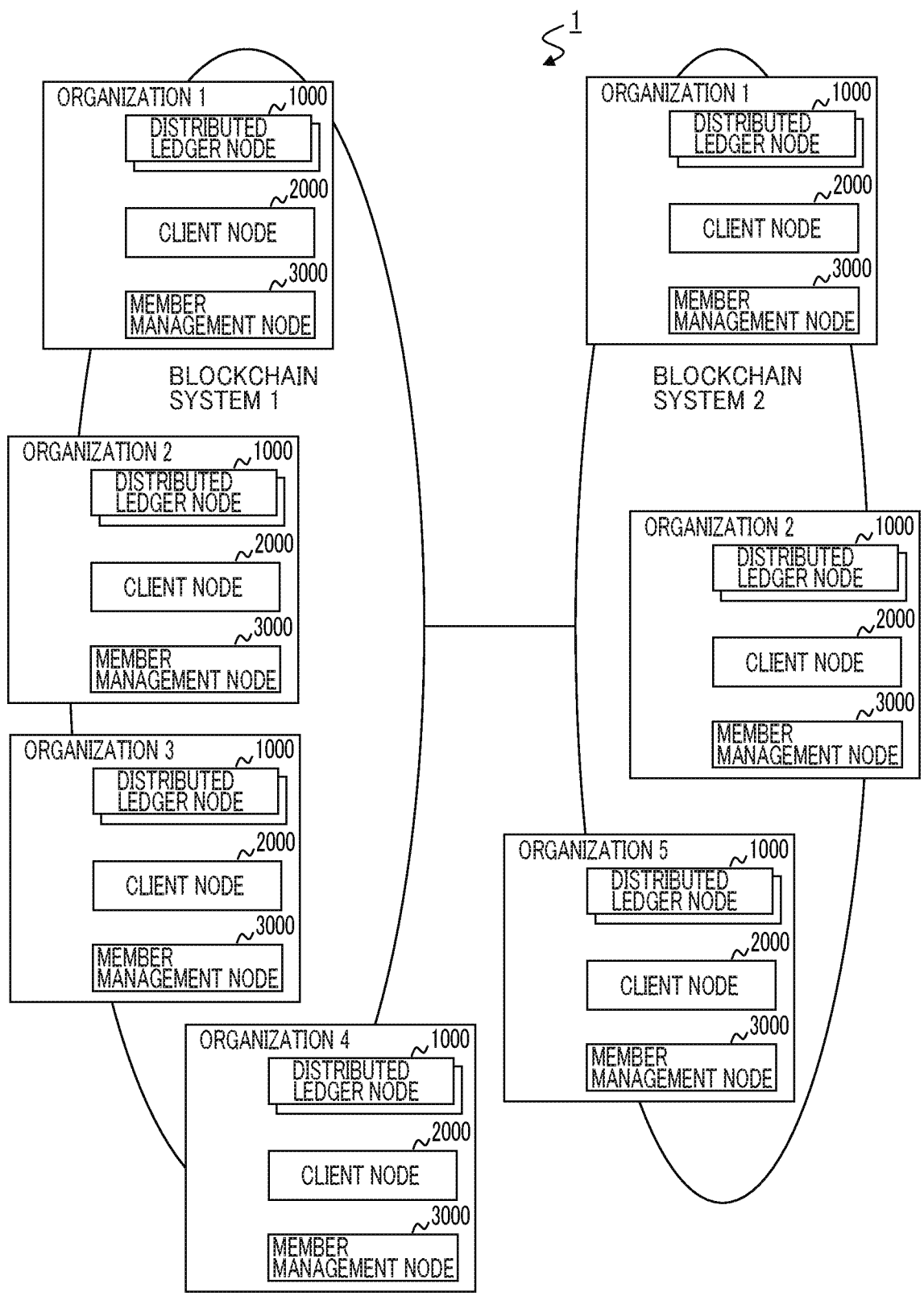
FIG. 2 is a diagram illustrating a logical configuration concept of the computer system according to the first embodiment.

FIG. 2 is a diagram illustrating a logical configuration concept of the computer system 1 according to the first embodiment. In an inter-blockchain system linkage, each of the blockchain systems 1 and 2 to be linked includes a plurality of the distributed ledger nodes 1000 which are included in a plurality of organizations.

TX is executed while forming consensus at a prescribed agreement level between the distributed ledger nodes 1000 of each participating organization of each of the blockchain systems 1 and 2, and the execution result of the TX is held, thereby sharing the information (ledger). Further, a predetermined logic as the SC is executed for the TX.

In the example illustrated in FIG. 2, the organizations participating in the blockchain system 1 includes organizations 1, 2, 3, and 4, and the organizations participating in the blockchain system 2 includes the organizations 1, 2, and 5. Therefore, the organizations participating in the respective blockchain systems to be linked are partially duplicated. However, the present invention is not limited to this example, and the participating organizations of the respective blockchain systems may completely match or may be completely different.

Further, an example is illustrated in which in addition to the distributed ledger nodes 1000, the client node 2000 and the member management node 3000 are held by each organization. However, the client node 2000 and the member management node 3000 may be shared across a plurality of organizations, and are not limited to the embodiment illustrated in FIG. 2.

Figure 3:
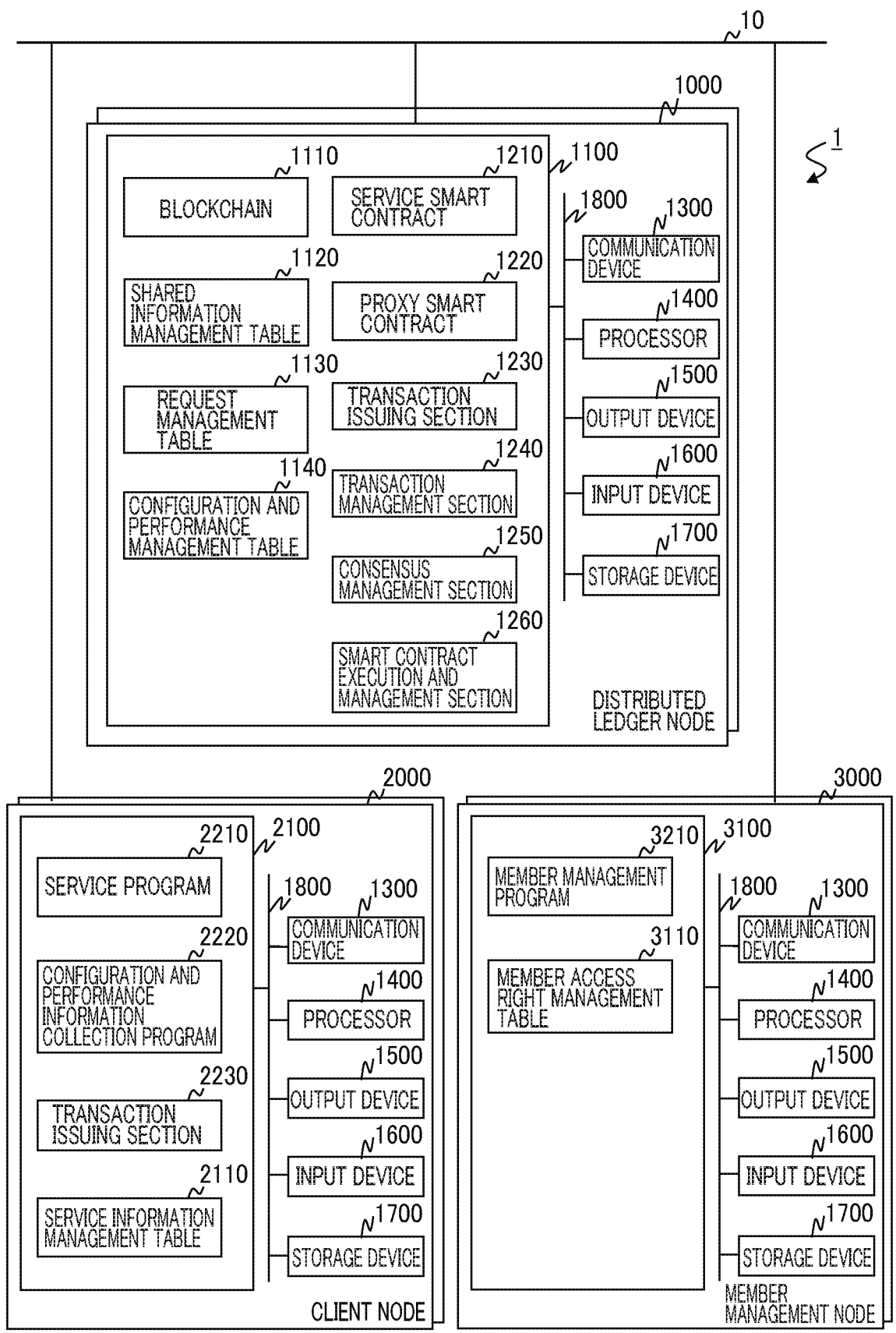
FIG. 3 is a configuration diagram of an example of the computer system according to the first embodiment.

FIG. 3 is a diagram illustrating an example of the configuration of the computer system 1 according to the first embodiment. The computer system 1 according to this example includes one or more distributed ledger nodes 1000, one or more client nodes 2000, and one or more member management nodes 3000.

It should be noted that the nodes are connected respectively to a network 10 and can be connected to each other. The network 10 may be any network such as IP (Internet Protocol or the like).

It is assumed that a plurality of distributed ledger nodes 1000 are normally present, and are operated and managed respectively by a body constituting a consortium (for example, a plurality of service enterprises, a plurality of organizations, and a plurality of vendors).

Such distributed ledger nodes 1000 each includes a memory 1100, a communication device 1300, a processor 1400, an output device 1500, an input device 1600, and a storage device 1700. These are connected to each other via an internal bus 1800 in the distributed ledger node 1000.

A blockchain 1110, a shared information management table 1120, the request management table 1130, a configuration and performance management table 1140, the service smart contract 1210, a proxy smart contract 1220, a transaction issuing section 1230, a transaction management section 1240, a consensus management section 1250, and a smart contract execution and management section 1260 (hereinafter referred to as SC execution and management section 1260) are stored in the memory 1100.

The communication device 1300 is a suitable device such as a network interface card for connecting the distributed ledger node 1000 to the network 10. The distributed ledger node 1000 may utilize the communication device 1300 to communicate with programs running on the client node 2000 and programs running on the member management node 3000 through the network 10.

The processor 1400 is an arithmetic apparatus configured to execute various programs developed on the memory 1100.

The output device 1500 is a device configured to output a processing result executed by the distributed ledger node 1000, and includes, for example, a display or the like.

The input device 1600 is a device for inputting an instruction to the distributed ledger node 1000 by a blockchain system manager or a blockchain system user, and includes, for example, a keyboard or the like.

The storage device 1700 is a storage medium such as a Hard Disk Drive (HDD) for storing information, a Solid State Drive (SSD), a flash memory or the like.

The distributed ledger node 1000 performs the deployment of the SC via the function of the SC execution and management section 1260, and then accepts the TX via the network 10 by the function of the transaction management section 1240, thereby forming consensus with other nodes whether the TX may be accepted via the function of the consensus management section 1250.

Further, when the consensus is formed, the distributed ledger node 1000 performs execution for the deployed SC via the function of the SC execution and management section 1260 and records the history of the TX in the blockchain 1110 and the state information based on the execution result in the shared information management table 1120.

In this example, the SC includes two contracts, that is, the service smart contract 1210 and the proxy smart contract 1220.

Of these two contracts, the service smart contract 1210 is a program for implementing business logic for each service system.

The proxy smart contract is a program for implementing inter-blockchain system linkage processing.

The transaction management section 1240 receives the TX upon receiving a request from each node such as the client node 2000, and provides a function and interface for acquiring or browsing the TX history information.

In this example, the distributed ledger node 1000 is also able to issue the TX, and in this case, various TXs are issued via the transaction issuing section 1230.

It should be noted that the smart contract 1210 and the proxy smart contract 1220 as the information relating to various services are also stored and managed in the blockchain 1110 and the shared information management table 1120.

On the other hand, it is assumed that the client node 2000 is used by the participant of the service realized by a service program 2210.

The client node 2000 illustrated in FIG. 3 includes the memory 2100, the communication device 1300, the processor 1400, the output device 1500, the input device 1600, and the storage device 1700. These are connected to each other via the internal bus 1800 in the client node 2000.

A service information management table 2110, a service program 2210, a configuration and performance information collection program 2220, and a transaction issuing section 2230 are stored in the memory 2100.

The service program 2210 receives input of information related to the service from the user, and stores the information in the service information management table 2110. In addition, the service program 2210 issues the TX including the information via the transaction issuing section 2230, and transmits the TX to the distributed ledger node 1000.

It should be noted that the service program 2210 provides the above-mentioned TX with the issuer information. The issuer information includes a member ID given in advance from the member management node 3000 and authentication information (secret key) issued by the member management node 3000 for each member.

The configuration and performance information collection program 2220 is a program for collecting configuration information, performance information, and the like of the distributed ledger node 1000, the client node 2000, and the member management node 3000.

Since the components of the other client nodes are the same as those of the distributed ledger node 1000, description thereof will not be repeated.

On the other hand, the member management node 3000 is responsible for issuing authentication information (secret key) to the participants to the blockchain systems 1 and 2.

The member management node 3000 includes a memory 3100, the communication device 1300, the processor 1400, the output device 1500, the input device 1600, and the storage device 1700. These are connected to each other via the internal bus 1800 in the member management node 3000.

A member management table 3110 and a member management program 3210 are stored in the memory 3100 described above.

The member management program 3210 provides a new issuance of authentication information of members participating in the consortium and an authentication function at the time of TX execution.

It is assumed that the member management program 3210 performs authentication of the participating member, signature of the TX, and control of the SC execution authority by using a pair of a secret key and a public key.

Key information such as a secret key and a public key for such member management is stored and managed in a member access right management table 3110.

Here, when the TX is received, the transaction management section 1240 in the distributed ledger node 1000 confirms whether the issuer of the TX is the authorized and right participant via the function of the member management program 3210 in the member management node 3000.

Since the components of the other member management node are the same as those of the distributed ledger node 1000, description thereof will not be repeated.

It should be noted that, in the example illustrated in FIG. 3, various programs and tables are stored in the memory regarding the distributed ledger node 1000, the client node 2000, and the member management node 3000, but may be stored in the storage device 1700 or other storage medium (not illustrated).

In this case, the processor 1400 reads the program of interest on the memory at the time of program execution and executes the read program.

FIG. 4 is a diagram illustrating an example of the request management table 1130 according to the first embodiment. The request management table 1130 stores information on processing requests related to the linkage stored by the proxy SC 1220.

As an example, the request management table 1130 includes fields of a Request ID 1131, a Request Node ID 1132, a Request Content 1133, a Status 1134, and a Result 1135.

An identifier for uniquely identifying a processing request transmitted from another blockchain system is stored in the Request ID 1131.

Further, the Request Node ID 1132 stores an identifier for uniquely identifying the distributed ledger node 1000 in another blockchain system which has transmitted the processing request. In the Request Content 1133, contents of the processing request are stored.

In the Status 1134, the processing execution state is stored. In the example illustrated in FIG. 4, "Fin" is stored in the Status 1134 when the processing is completed, "Processing" is stored when the processing is being executed, and "Waiting" is stored when the processing is in the waiting state. However, the present invention is not limited to such a storage value.

The Result 1135 stores the execution result of the processing for the processing request. In FIG. 4, as a concrete example, if the processing is successful, "Success" is stored, and when the processing is not completed, "-" is stored, and in addition, when the processing is failed, the information of the execution result of "Failed" is stored. However, the invention is not limited thereto.

It should be noted that the form of the request management information in the present invention is not limited to the request management table 1130 illustrated here.

For example, information capable of identifying a processing request related to the linkage may be stored. For example, information on the transaction ID issued by the client node 2000, identification information for identifying another blockchain system that has transmitted the processing request, type information of another blockchain system that has transmitted the processing request, details of the processing result such as an error code, an error content may also be stored.

Flow Example 1

Figure 5:
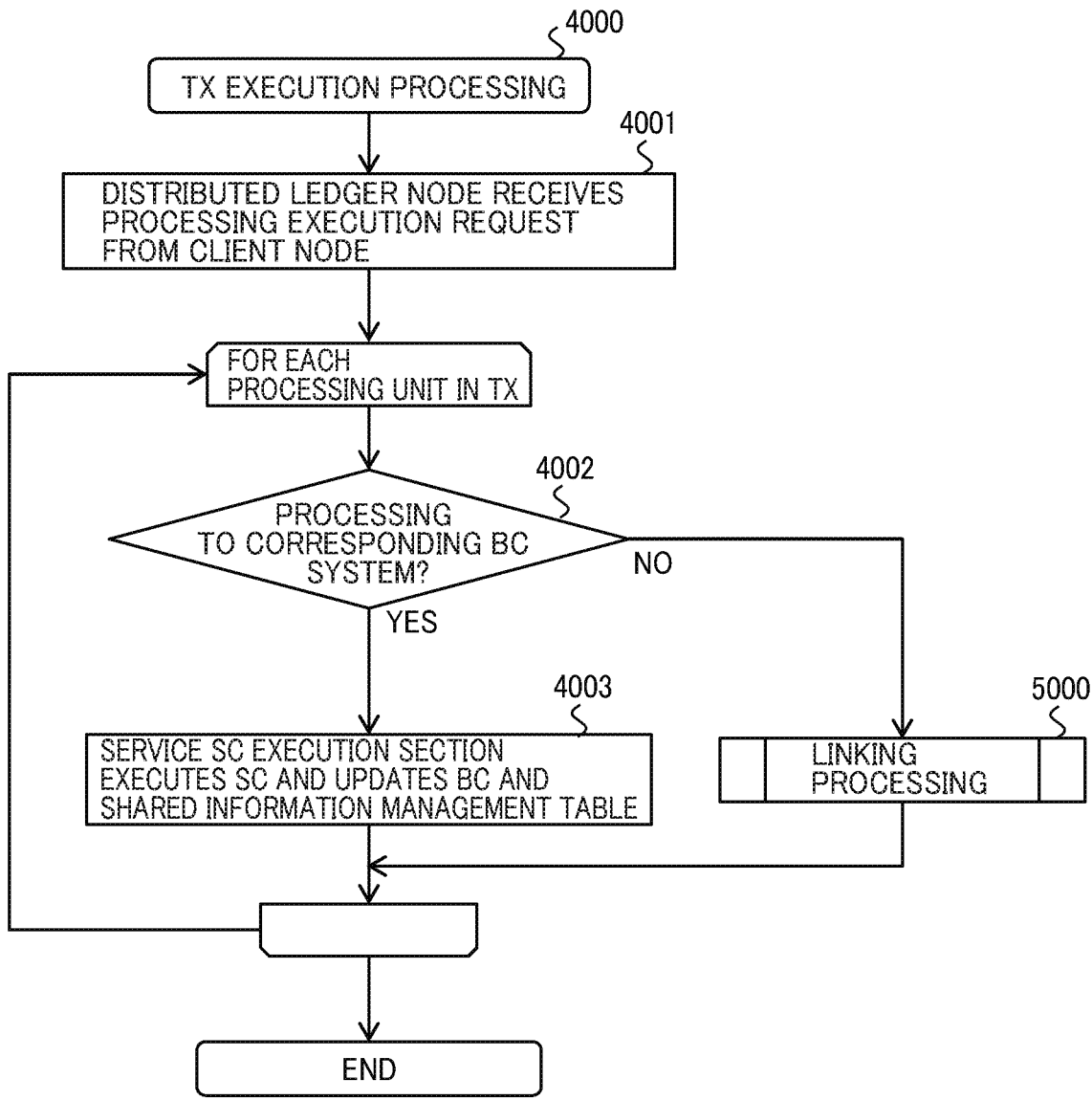
FIG. 5 is a flowchart of a TX execution processing according to the first embodiment.

FIG. 5 is a flowchart of the TX execution processing in the computer system 1 according to the first embodiment. This processing 4000 starts when the distributed ledger node 1000 receives the TX issued by the TX issuing section 2230 in the client node 2000 according to the instruction of the service program 2210 (Step 4001).

Then, the distributed ledger node 1000 determines whether processing to the blockchain system to which the distributed ledger node 1000 belongs or processing to another blockchain system is to be performed (Step 4002) for each processing unit in the TX.

The determination processing itself is determined by the TX management section 1240, and it is assumed that information about for which blockchain system the processing is to be executed is contained in the TX itself to be issued.

As a result of the above-described determination, in the case of processing for the blockchain system to which the distributed ledger node 1000 belongs (Step 4002: Yes), the SC execution and management section 1260 executes the service smart contract 1210 and updates the blockchain 1110 and the shared information management table 1120 in accordance with the processing contents of the issued TX (Step 4003).

On the other hand, as a result of the above determination, when the processing for another blockchain system is to be executed (Step 4002: No), the distributed ledger node 1000 executes the linking processing (Step 5000).

For example, when TX that executes three types of processing; "Request ID 1: Write ("XYZ Owner" B tentative")," to the blockchain system 1, "Request ID 2: Write ("A", Read ("A")+100), Write ("B", Read ("B")−100)" to BC system 2, and "Request ID 3: Write ("XYZ Owner", B)" to BC system 1 is issued, processing is executed in the order of Steps 4003, 5000 and 4003 in the TX execution processing 4000 and then the TX execution process is completed.

When the blockchain system is called as the linking processing 5000, it is executed with the authentication information for accessing the processing request attached.

For example, the secret key and public key information for the distributed ledger node is issued by registering the information of the distributed ledger node 1000 of the blockchain system on the calling side in advance to the member management node 3000 of the blockchain system on the called side as authentication information, and when the TX is executed, it is possible to acquire the execution permission of TX from the member management node 3000 of the blockchain system to be called by making a request by attaching the secret key information as authentication information on the calling side.

Other methods may also be used for taking over the authentication information. For example, instead of the distributed ledger node 1000, the information of the user who executes the TX is registered to the member management node 3000 of the blockchain system on the called side in advance, and a request is issued with the user's secret key information attached as authentication information.

Further, by using information such as fingerprint information, voiceprint information, or vein information which is linked to the user in a one-to-one correspondence as authentication information over the blockchain system, authentication information acquired in the blockchain system on the calling side may be called with the request attached thereto, and the execution permission of TX may be acquired from the member management node 3000 of the blockchain system on the called side. In any case, the present invention is not limited to the exemplary embodiment.

In addition, depending on the implementation method, as in Steps 4003 and 5000, the update processing is executed in two Steps of the processing simulation phase and the processing execution phase as in a system described in NTL 2 in addition to the case where the update processing is executed immediately after the SC execution.

In this case, in Step 4003, simulation of the processing to the corresponding blockchain system is performed, and in the linking processing in Step 5000, the registration of schedule to be executed is performed, or the simulation is executed to return the result to the calling side, or the temporary execution result is registered by simulation or the like, instead of executing the processing.

In this simulation phase, resources relating to execution in the execution phase may be reserved in association with the registration of the schedule of the execution and the execution result.

After the loop for each processing unit in the TX is completed, execution of the processing to the corresponding blockchain system is executed, and the contents of the execution schedule registered in the simulation phase are executed by remote calling or event notification or the like, or the simulated process is executed. It should be noted that the update processing by the event notification in the processing execution phase will be described with reference to FIG. 7.

In FIG. 5, the call in the linking processing may be performed synchronously or asynchronously.

When the processing is carried out asynchronously, by monitoring the execution status of the processing on the called side by periodic polling from the calling side, or by monitoring the event, the processing may be proceeded to the next stage after the loop for each processing unit in the TX is ended and whether the processing on the called side is passed or failed is confirmed.

Flow Example 2

Figure 6:
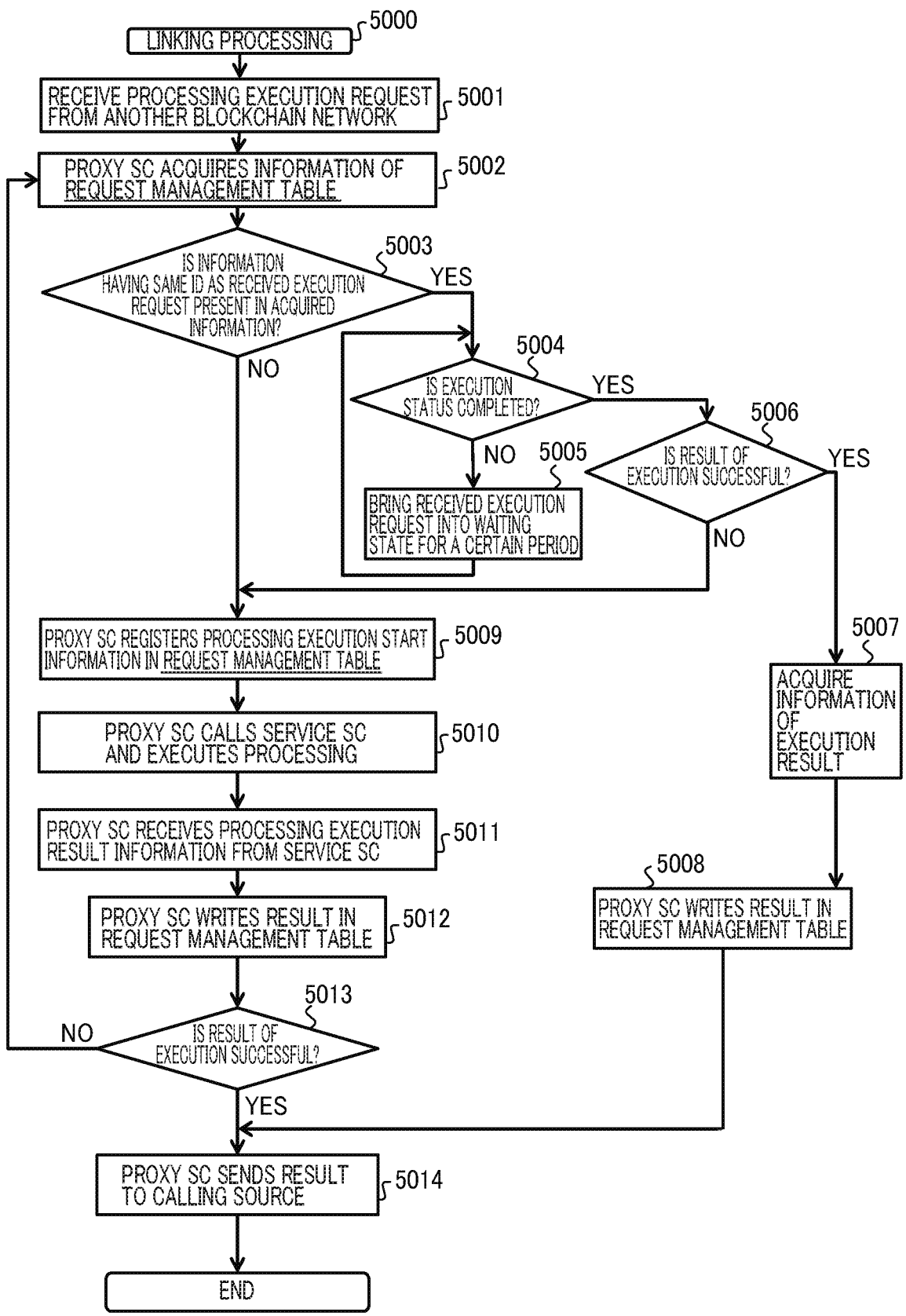
FIG. 6 is a flowchart of proxy processing of duplicated requests performed for each node according to the first embodiment.

FIG. 6 is a flowchart of processing executed by the proxy SC 1220 which operates on the distributed ledger node 1000 in the blockchain system on the called side (blockchain system 2 in FIG. 1) in the linking processing between the blockchain systems according to the first embodiment.

This processing 5000 starts by being called in the TX execution processing 4000 illustrated in FIG. 5 (Step 5001). This processing is executed at each of the distributed ledger nodes 1000 of the blockchain system on the called side.

First, the proxy SC 1220 acquires information of the request management table 1130 (Step 5002). Also, the proxy SC 1220 determines whether or not the information having the Request ID 1131 which is the same as the execution request received in Step 5001 is present in the acquired information in Step 5002 (Step 5003).

As a result of the above determination, if the information is present (Step 5003: Yes), the proxy SC 1220 checks the information of the Status column 1134 in the acquisition information in Step 5002 (Step 5004).

As a result, when no entry indicating that the Status column 1134 is "completed" is present (Step 5004: No), the proxy SC 1220, determining that the call processing, that is, execution of the processing request (the request caused by the TX that the TX issuing section 2230 of the client node 2000 issues by the instruction of the service program 2210, hereinafter) has already been started in the same distributed ledger nodes 1000 of the blockchain system on the called side, and that the processing is not completed, brings the execution request into the waiting state for a certain period (Step 5005), and returns to Step 5004.

On the other hand, when an entry indicating completion of the Status column 1134 is present in Step 5004 (Step 5004: Yes), the proxy SC 1220 determines that the call processing due to the same TX has already been completed, and confirms the execution result (Step 5006).

As a result of the confirmation, when the execution result is successful (Step 5006: Yes), the proxy SC 1220 acquires information of the Result column 1135 of the information having the same Request ID 1131 (Step 5007).

Further, the proxy SC 1220 writes the information acquired in Step 5007 in the request management table 1130 (Step 5008), and executes the processing in Step 5014 and subsequent Steps.

On the other hand, in Step 5003, when no information having the same Request ID 1131 is present (Step 5003: No), or if the execution result is failed in Step 5006 (Step 5006: No), the proxy SC 1220 registers the information of the processing request as "being execute" in the Status column 1134 in the request management table 1130 (Step 5009).

Here, examples of the case of processing failure include when an invalid parameter is given in the execution processing, when there is no execution authority, and when the execution an error condition is encountered in the course of processing.

When a predetermined error is returned in this manner, it is determined to be an error, and writing the processing results in the request management table 1130 is conceivable.

Further, as other cases of processing failure, it is considered that the processing is heavy and takes long time or the execution processing is stopped due to application of a load. In such a case, it is conceivable that the processing execution timeout is provided, and even when the processing execution result cannot be acquired in Step 5011, the processing is aborted after the lapse of a certain time, and the result of the time-out error is written in the request management table 1130 in Step 5012.

Next, the proxy SC 1220 issues a processing request to the service SC 1210 (Step 5010), and receives the execution result information (Step 5011).

In Step 5012, the proxy SC 1220 updates the Status column 1134 of the entry indicating the processing request in the request management table 1130 to a state of completion of processing, and registers the process execution result in the Result column 1135.

Here, if the execution result is not successful (Step 5013: No), the proxy SC 1220 returns to Step 5002 to execute retry, or again from confirmation of the status of other processing requests which are the same TX, and resumes the other call processing in the same distributed ledger node 1000 which has the same identification information and is in the waiting state.

It should be noted that when the execution result is successful (Step 5013: Yes), the proxy SC 1220 returns the result to the blockchain system (blockchain system 1 in FIG. 1) of the calling side (Step 5014).

When the processing in Step 5014 is executed after the processing execution of Step 5008, the processing execution result is a result acquired by a call processing from another distributed ledger node 1000 in the blockchain system on the calling side due to the same TX.

In this specification, the call processing originally written in the request management table 1130 out of the call processings caused by the same TX is unconditionally executed in the blockchain system on the called side. However, the present invention is not limited thereto and, for example, the call processing may be queued for a fixed time in the proxy SC 1220, and the call processing having the same Request Content may be executed only when the call processing is queued for a certain number or more of times.

Accordingly, even when the call processing with the same request ID received at the distributed ledger node 1000 of the blockchain system on the called side includes incorrect call processing by the number not more than the above-described certain number, so that erroneous execution is avoided even when the call processing is initially written in the request management table 1130.

Further, when a certain time has elapsed since the information on the call processing management is no longer necessary, such as when the information stored in the request management table 1130 is managed for each of the distributed ledger nodes 1000 as log information related to the call processing between the blockchain systems, or when a reply is sent to the blockchain on the side where a required number of replies are to be called for operating the service SC, deletion or the like is performed.

In addition, if the processing result received in Step 5011 is unsuccessful, the process returns to Step 5010, and the retry operation may be performed.

Further, when the linking processing 5000 fails even after a certain time, the processing can be terminated by sending the result of processing failure to the calling source even in the course of processing.

Further, if a failure is repeated at a certain number or more in Step 5013, the processing in the thread is kept stopped in the waiting state, and the processing in the other thread caused by the same TX may be waited for. However, the present invention is not limited thereto (not illustrated).

The processing execution request is received in Step 5001 and the processing execution result is returned to the calling source in Step 5014. However, the present invention is not limited thereto and, for example, linkage may be realized by executing the processing of Step 5000 asynchronously to store the processing execution result and polling the process execution result periodically by the calling source.

Flow Example 3

Figure 7:
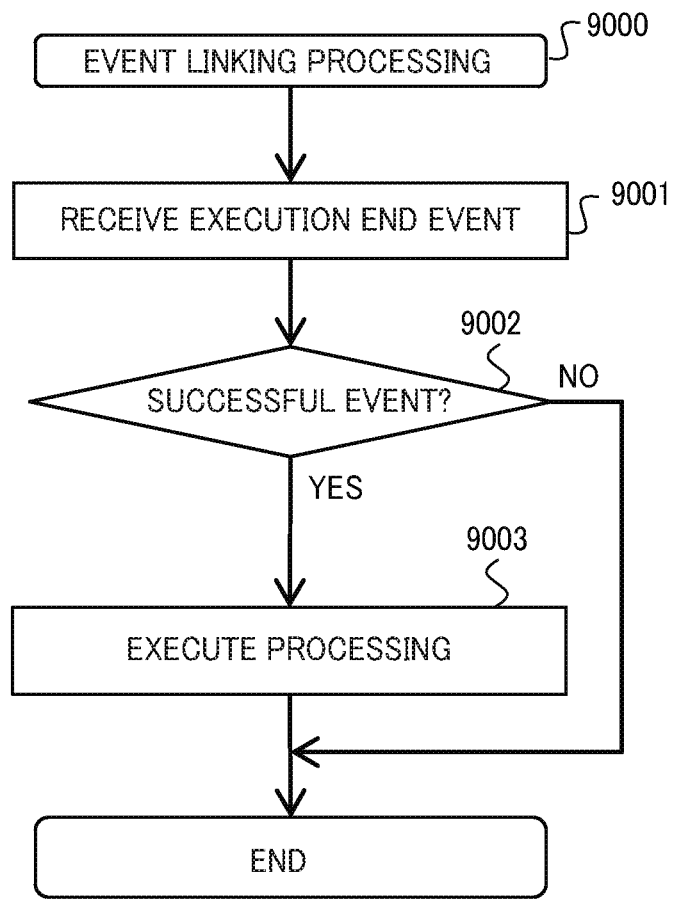
FIG. 7 is a flowchart of update processing according to an event notification according to the first embodiment.

FIG. 7 is a flowchart of the update processing by the event notification necessary only when the update processing is executed in two Steps, that is, the processing simulation phase and the processing execution phase.

This processing 9000 corresponds to the processing to be performed after the execution of the processing to the corresponding blockchain system is executed after the loop for each processing unit in the TX illustrated in FIG. 5 is completed.

An execution complete event is issued from the distributed ledger node 1000 of the blockchain system on the calling side (blockchain system 1) to the distributed ledger node 1000 of the blockchain system on the called side (blockchain system 2), and the event is received by the distributed ledger node 1000 of the blockchain system on the called side, whereby the processing is started (Step 9001).

For the event reception, it is necessary to set up the information necessary for receiving the event such as the IP address or the like and information indicating that the event notification is to be received in the distributed ledger node 1000 of the blockchain system on the calling side, at the time of executing the linking processing in the processing simulation phase.

In the event linking processing 9000, the proxy SC 1220 of the blockchain system on the called side receives an execution end event from the blockchain system on the calling side (Step 9001).

Next, the proxy SC 1220 determines whether the received event is an event indicating success of execution (Step 9002) or not.

As a result of the above determination, if the event is an event indicating success (Step 9002: Yes), the proxy SC 1220 executes the contents of execution schedule registered in the processing simulation phase, executes the simulated process, or execute processing including describing the processing to be executed in the blockchain system on the called side in the successful event and executing the contents, and then terminates the event linking processing (Step 9003).

When the execution of the processing is unsuccessful here, the content of execution registered in the simulation phase and the simulated result of the processing are deleted.

Further, when the event received in Step 9001 determines a successful event in Step 9002, if the number of received events or the number of successful events among the received events is equal to or greater than a certain number, execution processing in Step 9003 may be performed, but not limited thereto.

As described above, according to this embodiment, by providing the SC having the proxy function for linking to the blockchain system on the called side in linkage between the blockchain systems, it is possible to realize the proper linking processing without a single confidence point.

Accordingly, when the blockchain system used for the commercial stream and the blockchain system used for the money stream are individually constructed on the basis of their requirements, transaction and transfer of assets connected to payment are enabled. Therefore, the commercial transaction in the real world can be realized on a system utilizing a blockchain.

Since the base used in the blockchain system is generally selected in consideration of characteristics such as specialization to the virtual currency or emphasizing performances in many cases, it is unlikely that the base is unified into a single blockchain system. Therefore, there seems to arise more cases that constructing the individual blockchain systems and interlocking these blockchain systems to each other are required.

It should be noted that in this example, it is assumed that each of the distributed ledger nodes 1000 of the blockchain system on the calling side becomes a body of processing, and issues a processing execution request to each of the distributed ledger node 1000 of the blockchain system on the called side. Therefore, it covers the case where the call processing is required to be executed one by one for each of the distributed ledger nodes 1000 of the blockchain system on the called side.

Second Embodiment

The configuration example of the computer system 1 according to this example will not be described in detail with reference to the parts similar to those of the first embodiment. FIG. 8 is a diagram illustrating an example of the request management table 1130 according to the second embodiment.

The request management table 1130 in the second embodiment is different to the first embodiment in being shared across the distributed ledger node 1000 in the blockchain.

In this case, in the request management table 1130, the proxy SC 1220 stores the information of the call processing, that is, the processing request relating to the linkage between the blockchain systems.

As an example, the request management table 1130 includes fields of a Request ID 1131, a Request Node ID 1132, a Receive Node ID 1136, a Request Content 1133, a Status 1134, and a Result 1135.

In the Request ID 1131, an identifier for uniquely identifying a processing request transmitted from another blockchain system is stored.

Further, the Request Node ID 1132 stores an identifier for uniquely identifying the distributed ledger node 1000 in another blockchain system which has transmitted the processing request.

Further, the Receive Node ID 1136 stores an identifier for uniquely identifying the distributed ledger node 1000 in the blockchain system on the called side.

Further, the Request Content 1133 stores the contents of the processing request, the Status 1134 stores the processing execution state, and the Result 1135 stores the execution result of the processing.

A specific example of the values stored in these columns is the same as that illustrated in FIG. 4, and therefore description thereof will not be repeated.

Flow Example 4

Figure 9:
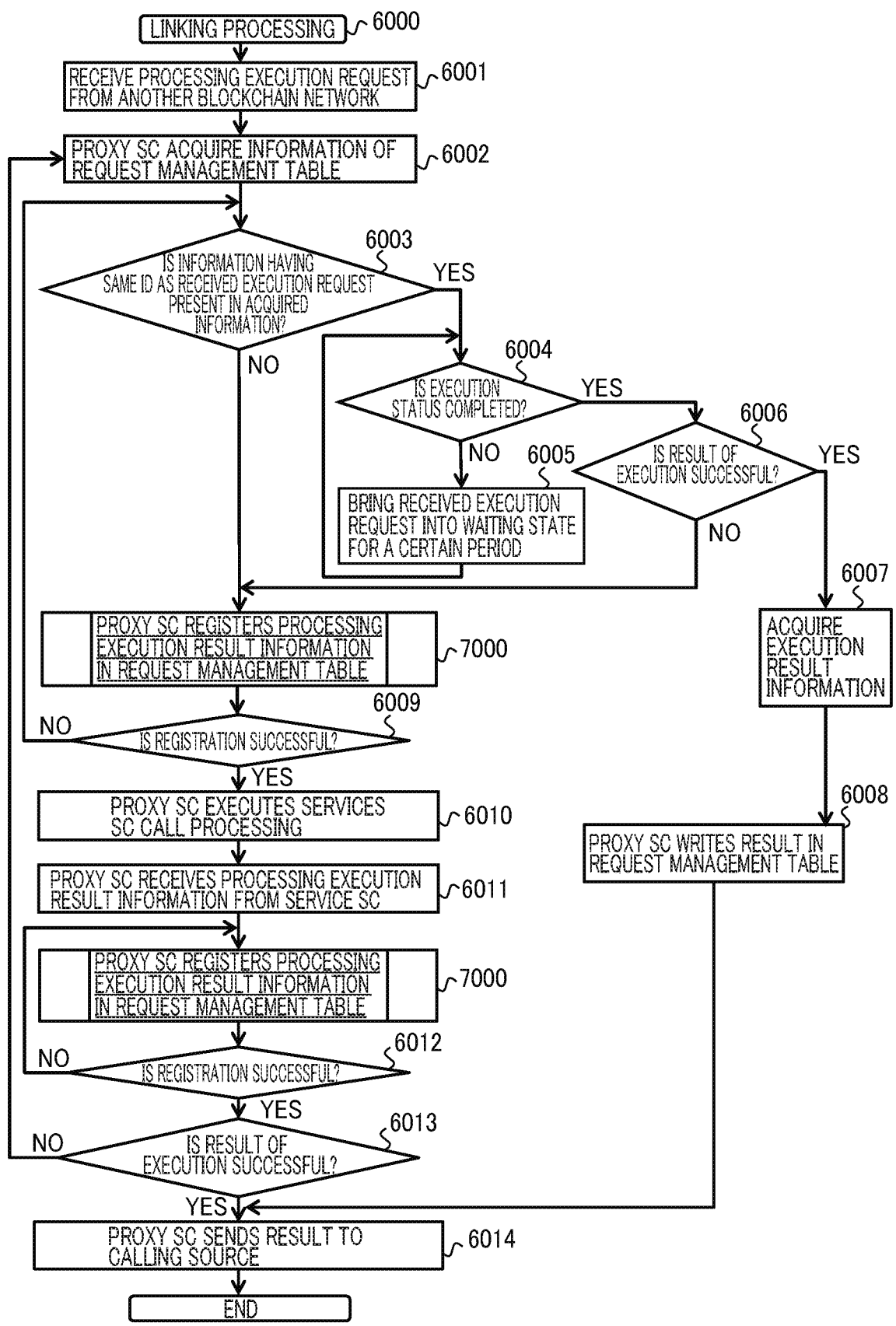
FIG. 9 is a flowchart of proxy processing of duplicated requests performed over a node span according to the second embodiment.

FIG. 9 is a flowchart of a processing executed by the proxy SC 1220 which operates on the distributed ledger node 1000 in the blockchain system (blockchain system 2 in FIG. 1) on the called side in the linking processing between the blockchain systems according to the second embodiment.

This processing 6000 starts by being called in the TX execution processing 4000 illustrated in FIG. 5 (Step 6001). This processing is also executed at each of the distributed ledger nodes 1000 of the blockchain system on the called side. First, the proxy SC 1220 acquires information of the request management table 1130 (Step 6002).

Also, the proxy SC 1220 determines whether or not the information having the Request ID 1131 which is the same as the processing request received in Step 6001 is present in the acquired information in Step 6002 (Step 6003).

In this example, since the request management table 1130 is shared across the distributed ledger nodes 1000 in the blockchain system, when the corresponding TX, that is, execution of the processing request is started in one of the distributed ledger nodes 1000, the acquired information is present.

As a result of the above determination, if the information is present (Step 6003: Yes), the proxy SC 1220 checks the information of the Status column 1134 in the same acquired information (Step 6004).

As the result described above, when no entry in which the Status column 1135 is completed is present (Step 6004: No), the proxy SC 1220, determining that the call processing, (the request caused by the TX that the TX issuing section 2230 of the client node 2000 issues by the instruction of the service program 2210, hereinafter) that is, execution of the processing request has already been started in any of the distributed ledger nodes 1000 of the blockchain system on the called side, and that the processing is not completed, brings the processing request into the waiting state for a certain period (Step 6005), and returns to Step 6004.

On the other hand, when an entry in a state in which the Status column 1134 is completed is present in Step 6004 (Step 6004: Yes) as a result of above-described determination, the proxy SC 1220 determines that the call processing due to the same TX has already been completed, and confirms the execution result (Step 6006).

As a result described above, when the execution result is successful (Step 6006: Yes), the proxy SC 1220 acquires information of the Result column 1135 of the information having the same Request ID 1131 (Step 6007).

Further, the proxy SC 1220 writes the information in the request management table 1130 (Step 6008), and executes the processing in Step 6014 and subsequent Steps.

Also, the proxy SC 1220 acquires information of the Result column 1135 of the information having the same Request ID 1131 (Step 6006), and executes the processing of Step 7000 and the subsequent processing.

On the other hand, in Step 6003, when no information having the same Request ID 1131 is present (Step 6003: No), or if the execution result is failed in Step 6006 (Step 6006: No), the proxy SC 1220 registers the information of the processing request as "being execute" in the Status column 1134 in the request management table 1130 (Step 7000). The registration processing in the request management table 1130 will be described with reference to FIG. 10.

Subsequently, the proxy SC 1220 determines whether or not the registration of the information in the request management table 1130 has succeeded (Step 6009).

As a result of the above judgment, when the registration is unsuccessful (Step 6009: No), the proxy SC 1220 starts execution of the determination processing in Step 6003 again.

On the other hand, when the registration is successful as a result of the above judgment (Step 6009: Yes), the proxy SC 1220 proceeds to Step 6010.

In Step 6010, the proxy SC 1220 issues a processing request to the service SC 1210, and receives the execution result information (Step 6011).

It should be noted that examples of the processing failure here include when an invalid parameter is given in the execution processing, when there is no execution authority, and when the execution an error condition is encountered in the course of processing.

When a predetermined error is returned in this manner, it is determined to be an error, and writing the processing results in the request management table 1130 is conceivable.

Further, as other cases of processing failure, it is considered that the processing is heavy and takes long time because the execution processing is stopped due to application of a load.

In such a case, it is conceivable that the processing execution timeout is provided, and even when the processing execution result cannot be acquired in step 6011, the processing is aborted after the lapse of a certain time, and the result of the time-out error is written in the request management table 1130 in step 7000.

In addition, if the processing result received in Step 6011 is unsuccessful, the process returns to Step 6010, and the retry operation may be performed.

Further, when the linking processing 6000 fails even after a certain time, the processing can be terminated by sending the result of processing failure to the calling source even in the course of processing.

Further, if a failure is repeated at a certain number or more in Step 6013, the processing in the thread is kept stopped in the waiting state, and the processing in the other thread caused by the same TX may, but not limited to, be waited for (not illustrated).

The processing execution request is received in Step 6001 and the processing execution result is returned to the calling source in Step 6014. However, the present invention is not limited thereto and, for example, linkage may be realized by executing the processing of Step 6000 asynchronously to store the processing execution result and polling the process execution result periodically by the calling source.

Subsequently, in Step 6012, the proxy SC 1220 updates the Status column 1134 of the entry indicating the processing in the request management table 1130 to a state of completion of processing, and registers the process execution result in the Result column 1135.

Here, if the execution result is not successful (Step 6013: No), the proxy SC 1220 returns to Step 6003 to execute retry, or executes again from confirmation of the status of other call processing that is, of the processing request which are the same TX, and resumes the other call processing in the same node which has the same identification information, and is in the waiting state.

When the execution result is successful (Step 6013: Yes), the proxy SC 1220 returns the result to the blockchain system of the calling side (blockchain system 1 in FIG. 1) (Step 6014).

When the processing in Step 6014 is executed after the processing execution of Step 6008, the processing execution result is a result acquired by a call processing from another node in the blockchain system on the calling side due to the same TX.

Here, though not limitative, the configuration is such that the call processing originally written in the request management table 1130 out of the processings caused by the same TX is unconditionally executed in the blockchain system on the called side.

The information stored in the request management table 1130 is managed across the distributed ledger nodes 1000 as log information related to the call processing between the blockchain systems, and when the information of management of the call processing, that is, the processing request is no longer necessary, such as a case where a certain period of time has elapsed or a case where a required number of replies for operating the service SC 1210 is returned to the blockchain on the calling side, the access to the information is disabled, for example.

Flow Example 5

Figure 10:
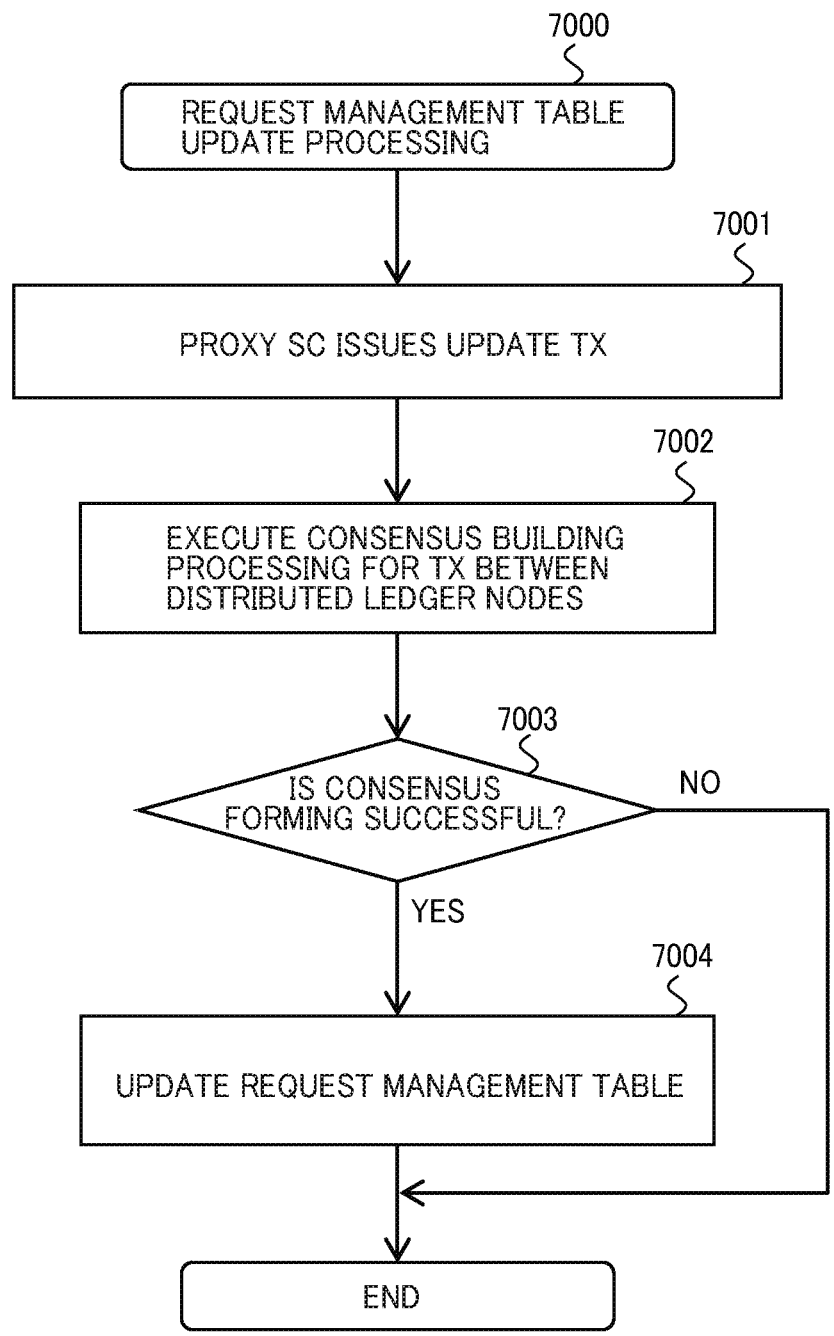
FIG. 10 is a flowchart of update processing of a request management table performed over the node span according to the second embodiment.

FIG. 10 is an example of a flowchart of a process in which the proxy SC 1220 executes the update of the request management table 1130 in the linking processing between the blockchain systems according to the second embodiment.

This processing 7000 starts by being called in the linking processing 6000 illustrated in FIG. 9. In this example, information of the request management table 1130 is shared across the distributed ledger nodes 1000 in the blockchain system.

First, the proxy SC 1220 issues an update TX (Step 7001). The proxy SC 1220 also executes the consensus forming processing for the TX between the distributed ledger nodes 1000 (Step 7002).

Finally, the proxy SC 1220 determines the consensus forming processing result (Step 7003). As a result of this determination, if consensus forming is successful (Step 7003: Yes), the proxy SC 1220 updates the request management table 1130 and ends the processing (Step 7004).

Here, an example of sharing the information among the distributed ledger nodes 1000 by holding the request management table 1130 by using the blockchain is illustrated, but the present invention is not limited thereto. Only provision of means for synchronizing access to the shared resource may be required, and for example, a distributed lock manager may be used.

As described above, according to this example, the same effects as those of the example 1 can be realized. Specifically, in this example, it is assumed that each of the distributed ledger nodes 1000 of the blockchain system on the called side becomes a body of processing, and that each of other distributed ledger nodes 1000 of the same blockchain system are requested to execute the processing.

Here, the distributed ledger node 1000 of the blockchain system on the calling side may call the same distributed ledger node 1000 and call the different distributed ledger node 1000 as the distributed ledger node 1000 of the blockchain system on the called side, and both cases are covered.

As a method of calling the different distributed ledger node 1000, there may be, but not limited to, a case where the distributed ledger node 1000 of the blockchain system on the calling side is selected randomly, or a method of setting the distributed ledger node 1000 defined to be called for each distributed ledger node 1000.

In either case, one call processing is executed in one distributed ledger node 1000 in the blockchain system on the called side.

Third Embodiment

The configuration example of the computer system 1 according to this example will not be described in detail with reference to the parts similar to those of the first embodiment. FIG. 11 is a diagram illustrating an example of the request management table 1130 according to the third embodiment.

In this case, a case where the request management table 1130 is shared by each of the distributed ledger nodes 1000 in the blockchain system and a case where request management table 1130 is shared across the distributed ledger nodes 1000 in the blockchain system are switched for management.

In the request management table 1130 illustrated in FIG. 11, the proxy SC 1220 stores the information of the request relating to the linkage between the blockchain systems.

In the request management table 1130 of this example, a field of Request Type 1137 is included. In this field, information indicating whether the linking processing between the blockchain systems is tight linkage or loose linkage is stored.

In particular, an example in which "Tight" is stored in the case of a tight linkage, and "Loose" is stored in the case of loose linkage is described. However, the present invention is not limited thereto.

Here, the term "tight linkage" represents a case in the first embodiment where each of the distributed ledger nodes 1000 of the blockchain system on the calling side illustrated becomes a body of processing, and each of the distributed ledger nodes 1000 of the blockchain system on the called side is requested to execute the processing.

In contrast, the term "loose linkage" represents a case illustrated in the second embodiment where the given distributed ledger nodes 1000 of the blockchain system on the called side becomes a body of processing, and each of the distributed ledger nodes 1000 of the blockchain system on the called side is requested to execute the processing. Since the other columns are the same as those in FIG. 8, description thereof will not be repeated.

In FIG. 11, although the request management table 1130 is illustrated in one table format, information of the entry in which Request Type 1137 is tight coupling in the request management table 1130 in this example includes information for each node of the blockchain system on the called side indicated by the Receive Node ID.

In contrast, information of the entry in which Request type 1137 in the request management table 1130 is loose coupling is shared among the distributed ledger nodes 1000 of the blockchain system on the called side.

Flow Example 6

Figure 12:
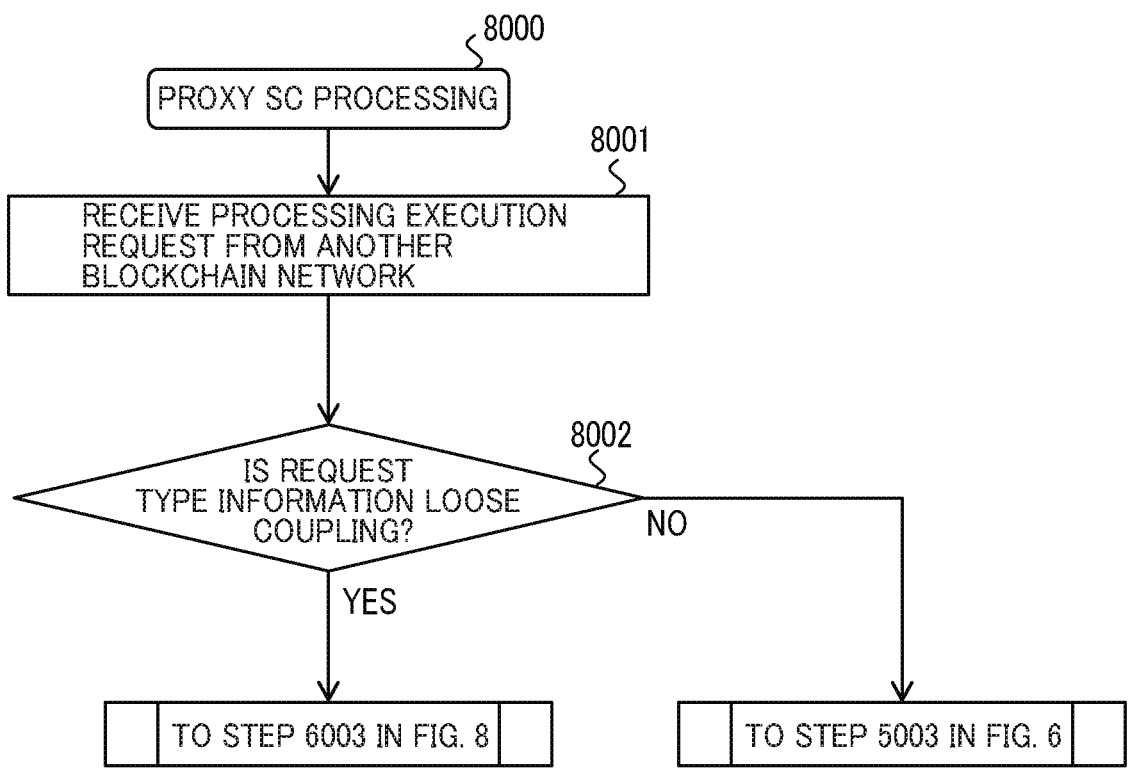
FIG. 12 is a flowchart of proxy processing according to the third embodiment.

FIG. 12 is a flowchart of a processing executed by the proxy SC 1220 which operates on the distributed ledger node 1000 in the blockchain system on the called side (blockchain system 2 in FIG. 1) in the linking processing between the blockchain systems according to the third embodiment.

This processing 8000 starts by being called in the TX execution processing 4000 illustrated in FIG. 5 (Step 8001).

First, the proxy SC 1220 determines whether the request type in the TX is loose coupling or tight coupling or not (Step 8002).

As a result of the determination described above, in the case of the loose coupling (Step 8002: Yes), the proxy SC 1220 executes the processing in Step 6003 and subsequent Steps and subsequent Steps in FIG. 9.

In contrast, as a result of the determination described above, in the case of the tight coupling (Step 8002: Yes), the proxy SC 1220 executes the processing in Step 5003 and subsequent Steps and subsequent Steps in FIG. 6.

Here, the TX includes information for determining whether the request type is loose coupling or tight coupling, so that, for example, determination may be made depending on the type of the protocol used in the call processing such as REST API, or a unique API presented by the blockchain system. If it is REST API, it may be determined to be the loose coupling, and if it is the unique API, it may be determined to be the tight coupling. However, the contents of determination are not limited thereto.

For example, the determination may be made based on the type of API provided in the distributed ledger node 1000 of the blockchain system of the calling target.

As described above, according to this example, even in the environment where the calling of the tight coupling illustrated in the first embodiment and the calling of the loose coupling illustrated in the second embodiment coexist in the linkage between the blockchain systems, it is possible to realize the correct linking processing without waste and without a single confidence point by switching the processing in the proxy SC 1220.

Since loose coupling and tight coupling are determined depending on the contents of linkage and the type of the blockchain system base, it is assumed that the tight coupling and the loose coupling are switched according to the service in the case where the linkage between the blockchain systems of 1:1 as illustrated in FIG. 2.

In addition, when the blockchain on the called side receives a call from a plurality of blockchain systems, switching for each blockchain on the calling side is conceivable.

Since it is assumed that a wide variety of services using the blockchain system are used and the entire system is constructed by utilizing the types of the blockchain base having different characteristics, the utilization range of this example is assumed to be wide.

Although the best mode for carrying out the present invention has been described thus far, the present invention is not limited thereto, and various modifications may be made without departing from the spirit and scope of the present invention.

According to the present embodiment configured as described above, efficient and appropriate inter-BC linking processing is achieved while securing transparency of processing under the environment where a single confidence point does not occur.

The description herein reveals at least the following. In other words, in the inter-system linking method of the present embodiment, the node may make call processing which has not been permitted to execute as a result of deduplication in a waiting state, and may manage information relating to the call processing as the request management information.

According to this configuration, the reply to each node of the calling source can be performed without omission while eliminating the duplication processing. Therefore, a more efficient and appropriate inter-BC linking processing can be realized while securing transparency of processing under the environment where a single confidence point does not occur.

Further, in the inter-system linking method according to the present embodiment, as a deduplication based on the policy, the node may narrow down a plurality of call processing having the same identification information into one call processing which is received first.

Accordingly, quick processing of the call processing and deduplication are both achieved. Therefore, a more efficient and appropriate inter-BC linking processing can be realized while securing transparency of processing under the environment where a single confidence point does not occur.

Further, in the inter-system linking method according to the present embodiment, as a deduplication based on the policy, the node may narrow down a plurality of call processing having the same identification information to given one call processing through forming consensus between nodes.

According to this configuration, it is possible to execute deduplication while ensuring the likelihood (that is, the authenticity) of the call processing. Therefore, a more efficient and appropriate inter-BC linking processing can be realized while securing transparency of processing under the environment where a single confidence point does not occur.

In the inter-system linking method of the present embodiment, each node may be configured to manage the request management information of itself to execute deduplication of the call processing for each node, so that the call processing is executed only once for each node.

According to this configuration, deduplication can be efficiently performed in response to a situation where a plurality of the same call processings is received at each node. Therefore, a more efficient and appropriate inter-BC linking processing can be realized while securing transparency of processing under the environment where a single confidence point does not occur.

Further, in the inter-system linking method of the present embodiment, when the call processing is failed at another node, the node may specify other call processing having identification information identical to that of the calling processing and in the waiting state in the request management information and restart the execution of the specified call processing.

Accordingly, it is possible to maintain the processing efficiency as a whole well in response to the occurrence of processing failure resulting from various conditions such as malfunction of a node and a communication environment or a non-genuine call processing mixed thereto by effectively utilizing a situation in which a plurality of the same call processings can be accepted. Therefore, a more efficient and appropriate inter-BC linking processing can be realized while securing transparency of processing under the environment where a single confidence point does not occur.

In the inter-system linking method of the present embodiment, the node may share the request management information between nodes in the distributed ledger system to which the node belongs, and may execute deduplication of the call processing across a portion between the nodes to execute the processing only once.

According to this configuration, it is possible to efficiently perform deduplication of processing in response to a situation in which each of the nodes belonging to a certain distributed ledger system accepts the same call processing. Therefore, a more efficient and appropriate inter-BC linking processing can be realized while securing transparency of processing under the environment where a single confidence point does not occur.

In the inter-system linking method of the present embodiment, the nodes may be configured to store the request management information in the blockchain after the acquisition of the mutual agreement to share the request management information between the nodes.

According to this configuration, it is possible to efficiently and accurately share request management information in the same distributed ledger system. Therefore, a more efficient and appropriate inter-BC linking processing can be realized while securing transparency of processing under the environment where a single confidence point does not occur.

Further, in the inter-system linking method of the present embodiment, when the processing called from the distributed ledger system fails in another system, the node may restart processing in any node in the same system that has the same identification information and is in a waiting state.

Accordingly, it is possible to maintain the processing efficiency as a whole well in response to the occurrence of processing failure resulting from various conditions such as malfunction of a node and a communication environment or a non-genuine call processing mixed thereto by effectively utilizing a situation in which each node of the same distributed ledger system accepts the same call processing. Therefore, a more efficient and appropriate inter-BC linking processing can be realized while securing transparency of processing under the environment where a single confidence point does not occur.

In the inter-system linking method of the present embodiment, when the node replies to the node of another distributed ledger system which is the source of the call processing, the processing result of the call processing may be copied and replied as a reply to each call processing in the waiting state in the request management information.

Accordingly, it is possible to achieve both deduplication of the call processing and the sure reply. Therefore, a more efficient and appropriate inter-BC linking processing can be realized while securing transparency of processing under the environment where a single confidence point does not occur.

In the inter-system linking method of the present embodiment, the node may acquire predetermined authentication information associated with the call processing, and manage access to the distributed ledger system to which the node belongs based on the authentication information.

According to this configuration, when the call processing is exchanged between the distributed ledger systems, it is possible to perform the processing in a corresponding secure environment. Therefore, a more efficient and appropriate inter-BC linking processing can be realized while securing transparency of processing under the environment where a single confidence point does not occur.

What is claimed is:

1. An inter-system linking method for computer nodes comprising a first blockchain distributed ledger system, to manage calls for processing smart contracts (SC), the calls made by programs executing on computer nodes comprising a second blockchain distributed ledger system, the calls for processing comprising call processings, the method comprising:

distributing, to the computer nodes comprising the first and second blockchain distributed ledger systems, a data structure configured to relate calls, calling node, processing called, execution status and execution result;

receiving by a node, a call processing comprising a call for processing by the node, a smart contract;

using by the node, the data structure to determine whether the requested call processing is a duplicate call processing;

if the call processing is a duplicate, deduplicating by the node, the duplicate call processing in accordance with a policy;

if the call processing is not a duplicate, making the call processing by the node.

2. The inter-system linking method according to claim 1, wherein the node makes call processing which has not been permitted to be executed as a result of the deduplication into a waiting state, and manages information related to the call processing as request management information.

3. The inter-system linking method according to claim 1, wherein to perform a deduplication based on the policy, the node combines a plurality of call processings having the same identification information into one call processing, wherein the one call processing is one which is initially received.

4. The inter-system linking method according to claim 1, wherein the node performs deduplication based on the policy, by combining a plurality of call processings having the same identification information into one call processing based upon consensus between nodes.

5. The inter-system linking method according to claim 2, wherein each node is configured to manage the request management information of itself to execute deduplication of the call processing for each node, so that the call processing is executed only once for each node.

6. The inter-system linking method according to claim 5, wherein when the call processing is failed at another node, the node specifies other call processing having identification information identical to that of the call processing and in the waiting state in the request management information and restarts the execution of the specified call processing.

7. The inter-system linking method according to claim 1, wherein the node is configured to share the request management information between nodes in the distributed ledger system to which the node belongs, and execute deduplication of the call processing across a portion between the nodes to execute the processing only once.

8. The inter-system linking method according to claim 7, wherein the nodes are configured to store the request management information in the blockchain after acquisition of a mutual agreement to share the request management information between the nodes.

9. The inter-system linking method according to claim 7, wherein when the processing called from the distributed ledger system fails in another system, the node restarts processing in any node in the same system that has the same identification information and is in a waiting state.

10. The inter-system linking method according to claim 2, wherein when the node replies to the node of another distributed ledger system which is the source of the call processing, a reply to each call processing in the waiting state in the request management information is made by copying the processing result of the call processing.

11. The inter-system linking method according to claim 1, wherein the node acquires predetermined authentication information associated with the call processing, and manages access to the distributed ledger system to which the node belongs based on the authentication information.

12. A computer comprising a node of a first distributed ledger system, the computer comprising:

a data structure configured to relate data comprising calls, calling nodes, requested execution steps, execution status and execution results corresponding to smart contracts maintained by a second distributed ledger system;

a processor configured to:

determine presence or absence of a duplicate call processing based on the data related by the data structure, deduplicate the duplicate call processing thereby managing call processing in response to calls from a program on a second distributed ledger system to process contract execution steps; and execute the call processing after deduplication of the call processing is executed based on a specific policy.

\* \* \* \* \*